US009692023B2

(12) United States Patent
Shimoda et al.

(10) Patent No.: US 9,692,023 B2
(45) Date of Patent: Jun. 27, 2017

(54) ELECTRICITY STORAGE MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Hiroki Shimoda, Yokkaichi (JP); Masakuni Kasugai, Yokkaichi (JP); Makoto Higashikozono, Yokkaichi (JP); Hisashi Sawada, Yokkaichi (JP); Kazuyuki Nakagaki, Yokkaichi (JP); Masato Tsutsuki, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 203 days.

(21) Appl. No.: 14/435,124

(22) PCT Filed: Sep. 11, 2013

(86) PCT No.: PCT/JP2013/074488
§ 371 (c)(1),
(2) Date: Apr. 10, 2015

(87) PCT Pub. No.: WO2014/057757
PCT Pub. Date: Apr. 17, 2014

(65) Prior Publication Data
US 2015/0228942 A1    Aug. 13, 2015

(30) Foreign Application Priority Data
Oct. 10, 2012  (JP) ................................ 2012-224719

(51) Int. Cl.
H01M 2/10       (2006.01)
H01M 2/22       (2006.01)
(Continued)

(52) U.S. Cl.
CPC ....... *H01M 2/1016* (2013.01); *H01M 2/1077* (2013.01); *H01M 2/206* (2013.01);
(Continued)

(58) Field of Classification Search
CPC ............. H01M 10/613; H01M 10/625; H01M 10/647; H01M 10/6551; H01M 10/6555;
(Continued)

(56) References Cited

U.S. PATENT DOCUMENTS

2006/0088761 A1* 4/2006 Ota .................... H01M 2/18
429/130
2006/0194102 A1   8/2006 Keshishian et al.
(Continued)

FOREIGN PATENT DOCUMENTS

JP    H07-022458 U    4/1995
JP    2002011590 A  * 1/2002  ............. B23K 26/10
(Continued)

OTHER PUBLICATIONS

Sep. 23, 2015 Search Report Issued in European Patent Applicaton No. 13845626.4.
(Continued)

*Primary Examiner* — Carlos Barcena
(74) *Attorney, Agent, or Firm* — Oliff PLC

(57) ABSTRACT

An electricity storage module is provided with a stack formed by stacking a plurality of electricity storage elements having positive and negative lead terminals that protrude outward from end portions. Differently polarized lead terminals of adjacent electricity storage elements are bent in
(Continued)

opposite directions and connected by superimposing and welding the end portions thereof.

7 Claims, 15 Drawing Sheets

(51) Int. Cl.
*H01M 2/30* (2006.01)
*H01M 2/20* (2006.01)
*H01M 10/6551* (2014.01)
*H01M 10/6555* (2014.01)
*H01M 10/625* (2014.01)
*H01M 10/647* (2014.01)
*H01M 10/613* (2014.01)

(52) U.S. Cl.
CPC ............ *H01M 2/22* (2013.01); *H01M 2/30* (2013.01); *H01M 2/305* (2013.01); *H01M 10/6551* (2015.04); *H01M 10/6555* (2015.04); *H01M 10/613* (2015.04); *H01M 10/625* (2015.04); *H01M 10/647* (2015.04); *H01M 2220/20* (2013.01)

(58) Field of Classification Search
CPC .......... H01M 2220/20; H01M 2/1016; H01M 2/1077; H01M 2/206; H01M 2/22; H01M 2/30; H01M 2/305; H01M 10/4235; H01M 2/021; H01M 2/204; H01M 2/345
See application file for complete search history.

(56) References Cited

U.S. PATENT DOCUMENTS

| | | | |
|---|---|---|---|
| 2008/0131765 A1 | 6/2008 | Imanaga et al. | |
| 2011/0223478 A1* | 9/2011 | Han | ........................ H01M 2/20 429/211 |
| 2012/0295485 A1 | 11/2012 | Ikeda et al. | |
| 2013/0065103 A1* | 3/2013 | Yumura | ................ E02F 9/0858 429/120 |
| 2014/0065885 A1 | 3/2014 | Nakayama | |

FOREIGN PATENT DOCUMENTS

| | | | | |
|---|---|---|---|---|
| JP | 2005-190885 | A | 7/2005 | |
| JP | 2007-026907 | A | 2/2007 | |
| JP | 2007-214025 | A | 8/2007 | |
| JP | 2008-123768 | A | 5/2008 | |
| JP | 2008-123769 | A | 5/2008 | |
| JP | 2008-243412 | A | 10/2008 | |
| JP | 2011-216424 | A | 10/2011 | |
| JP | 2012-064457 | A | 3/2012 | |
| JP | 2012-109275 | A | 6/2012 | |
| JP | 2012-146669 | A | 8/2012 | |
| JP | 2012-221804 | A | 11/2012 | |
| JP | 2013-097896 | A | 5/2013 | |
| WO | 2011/148641 | A1 | 12/2011 | |
| WO | WO 2012/091473 | A2 * | 7/2012 | ............. H01M 2/26 |
| WO | 2012/169373 | A1 | 12/2012 | |
| WO | 2013/061871 | A1 | 5/2013 | |

OTHER PUBLICATIONS

Nov. 5, 2013 International Search Report issued in International Application No. PCT/JP2013/074488.

* cited by examiner

ELECTRICITY STORAGE MODULE

The present invention relates to electricity storage modules.

BACKGROUND

Known examples of electricity storage elements that contain electricity storage devices include secondary batteries, such as lithium ion batteries and nickel hydrogen batteries. A plurality of secondary batteries, such as lithium ion batteries, are connected together to form a battery module. One such battery module is known, for example, from Patent Document 1.

CITATION LIST

Patent Documents

Patent Document 1: JP 2012-146669A

SUMMARY

Patent Document 1 discloses a battery module composed of a plurality of stacked electric cells with positive and negative lead terminals protruding from their ends.

In such a battery module, adjacent electric cells are connected with one another by superimposing and joining their lead terminals with different polarities (opposite polarities).

For this reason, if the dimension of protrusion of the lead terminals of the individual electric cells is enlarged, the length dimension of the battery module along the protrusion of the lead terminals also becomes large.

The present application has been prepared in view of the above-described circumstances and one object may be to provide a downsized electricity storage module.

The present application, which may solve the foregoing problem, is directed to an electricity storage module comprising a stack formed by stacking a plurality of electricity storage elements having positive and negative lead terminals that protrude outward from end portions thereof, wherein differently polarized lead terminals of adjacent ones of the electricity storage elements are bent in opposite directions and connected by superimposing and welding together end portions thereof.

In the present application, as the differently polarized lead terminals of the adjacent electricity storage elements are bent in opposite directions, the end portions of the lead terminals may overlap each other by orienting an end portion of a lead terminal of one electricity storage element toward the other electricity storage element and orienting an end portion of a lead terminal of that other electricity storage element toward the first electricity storage element. The differently polarized (reversely polarized) lead terminals of two adjacent electricity storage elements may be connected with each other by welding together the overlapping end portions of the two lead terminals. As a result, according to the present application, the length along the direction of protrusion of the lead terminals of the electricity storage elements can be shortened by the length from the bends of the lead terminals to the distal ends, thus allowing for downsizing of the electricity storage module formed by stacking such electricity storage elements.

The present application may have the structures described below.

The lead terminals may be provided with a stress reducing portion for reducing stress applied to the lead terminals during welding.

As this structure lessens the stress of welding, the reduction in strength of the lead terminals caused by the stress applied can be limited.

The differently polarized lead terminals of the adjacent electricity storage elements may be connected by laser welding.

This structure may allow for minute and precision welding.

Holder members made of an insulating resin for holding the electricity storage elements may be included, and the holder members may be formed with insertion ports into which jigs for welding together the differently polarized lead terminals of the adjacent electricity storage elements can be inserted transversely across the direction of the protrusion of the lead terminals.

In the present application, as the lead terminals are bent, the portions of the lead terminals from the bends to the distal ends is directed transversely across the direction in which the lead terminals protrude. Accordingly, as the foregoing structure allows the welding jigs to be inserted into the holder members transversely across the direction in which the lead terminals protrude, the lead terminals can be welded after the holder members, which maintain the insulation between the electricity storage elements, are attached.

Accordingly, a downsized electricity storage module can be provided.

DETAILED DESCRIPTION

Embodiment 1

Figure 4:
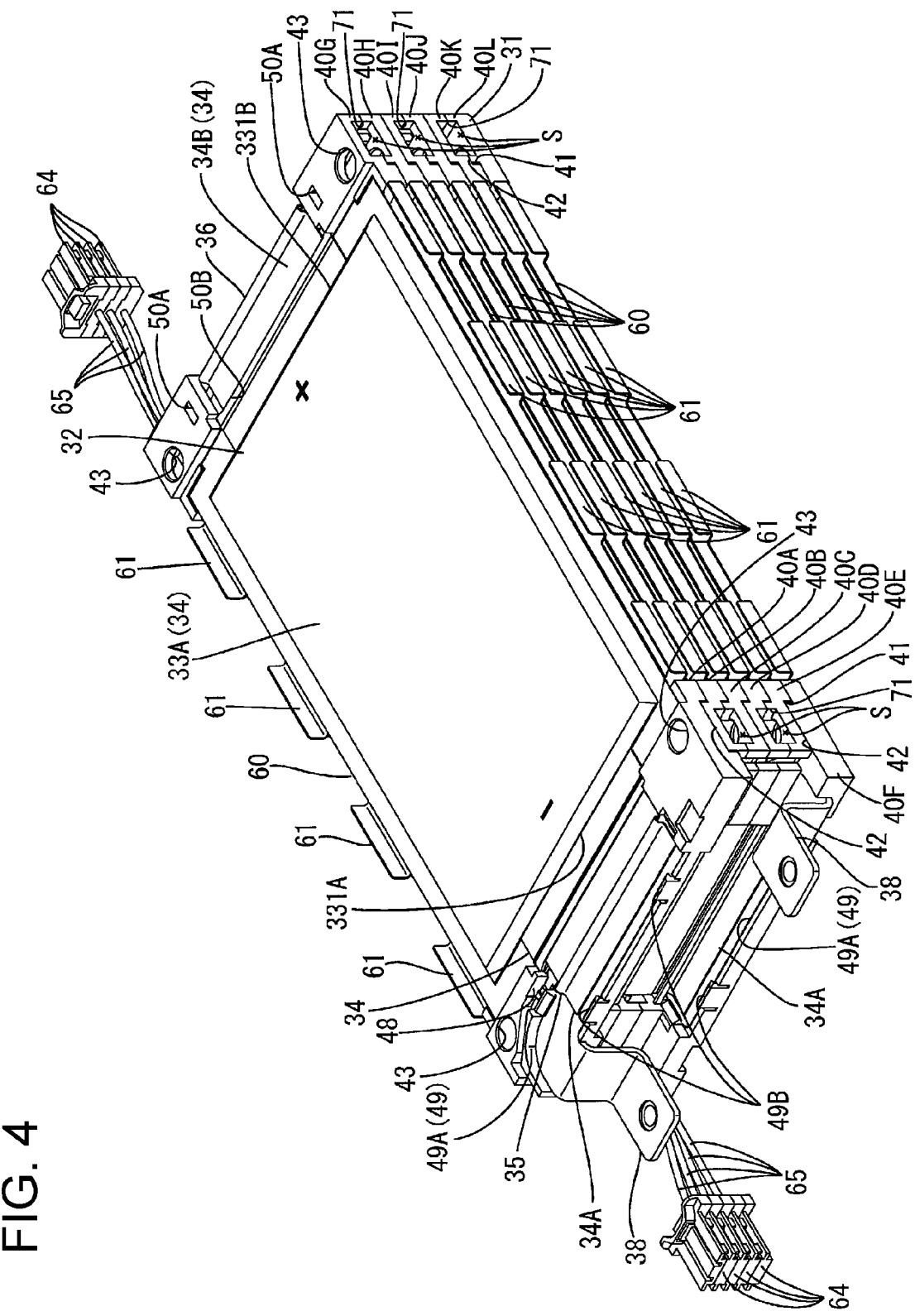
FIG. 4 is a perspective view of a stack of electricity storage elements.
Figure 5:
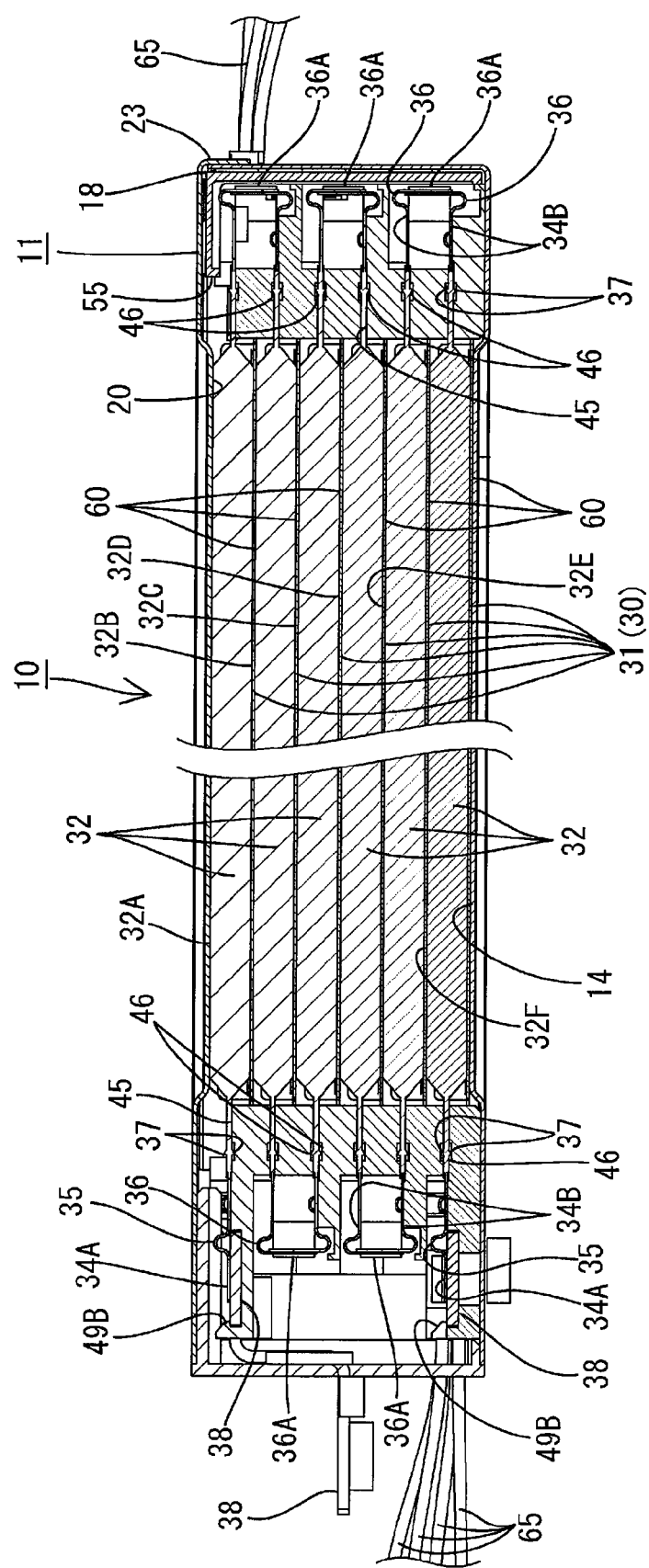
FIG. 5 is a cross-sectional view taken along line A-A of FIG. 2.

Embodiment 1 of the present application as applied to a battery module will be described hereafter with reference to FIGS. 1-15. In the ensuing description, the left side as seen in FIGS. 2, 4, and 5 is referred as the front, and the right side as seen in FIGS. 2, 4, and 5 is referred as the rear, whereas the upper side as seen in FIGS. 5, 12, and 14 is referred as upward and the lower side as seen in FIGS. 5, 12, and 14 is referred as downward.

The battery module 10 of this embodiment is used, for example, as the battery module 10 of an integrated starter generator (ISG).

Battery Module 10

Figure 1:
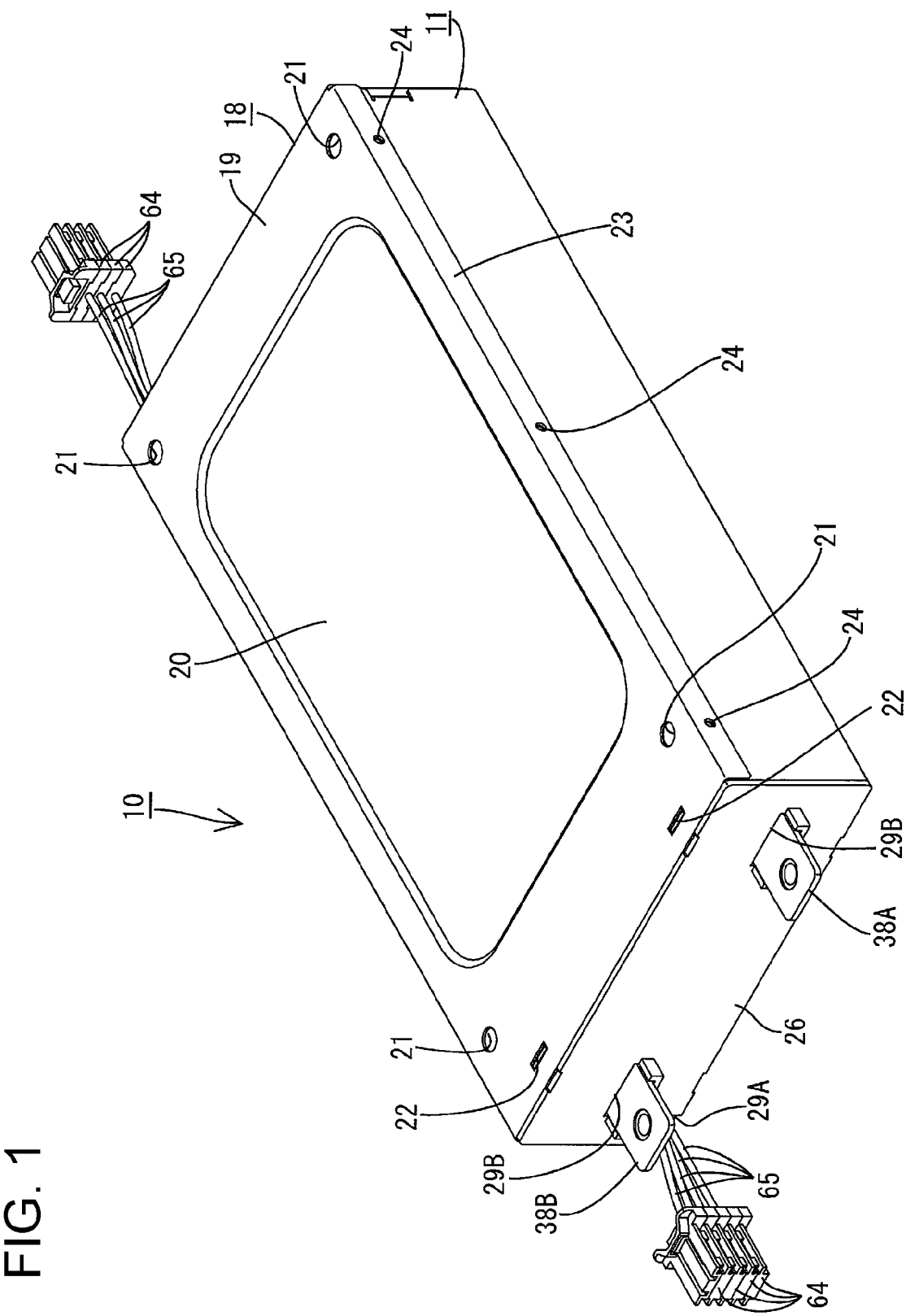
FIG. 1 is a perspective view of an electricity storage module of Embodiment 1.
Figure 2:
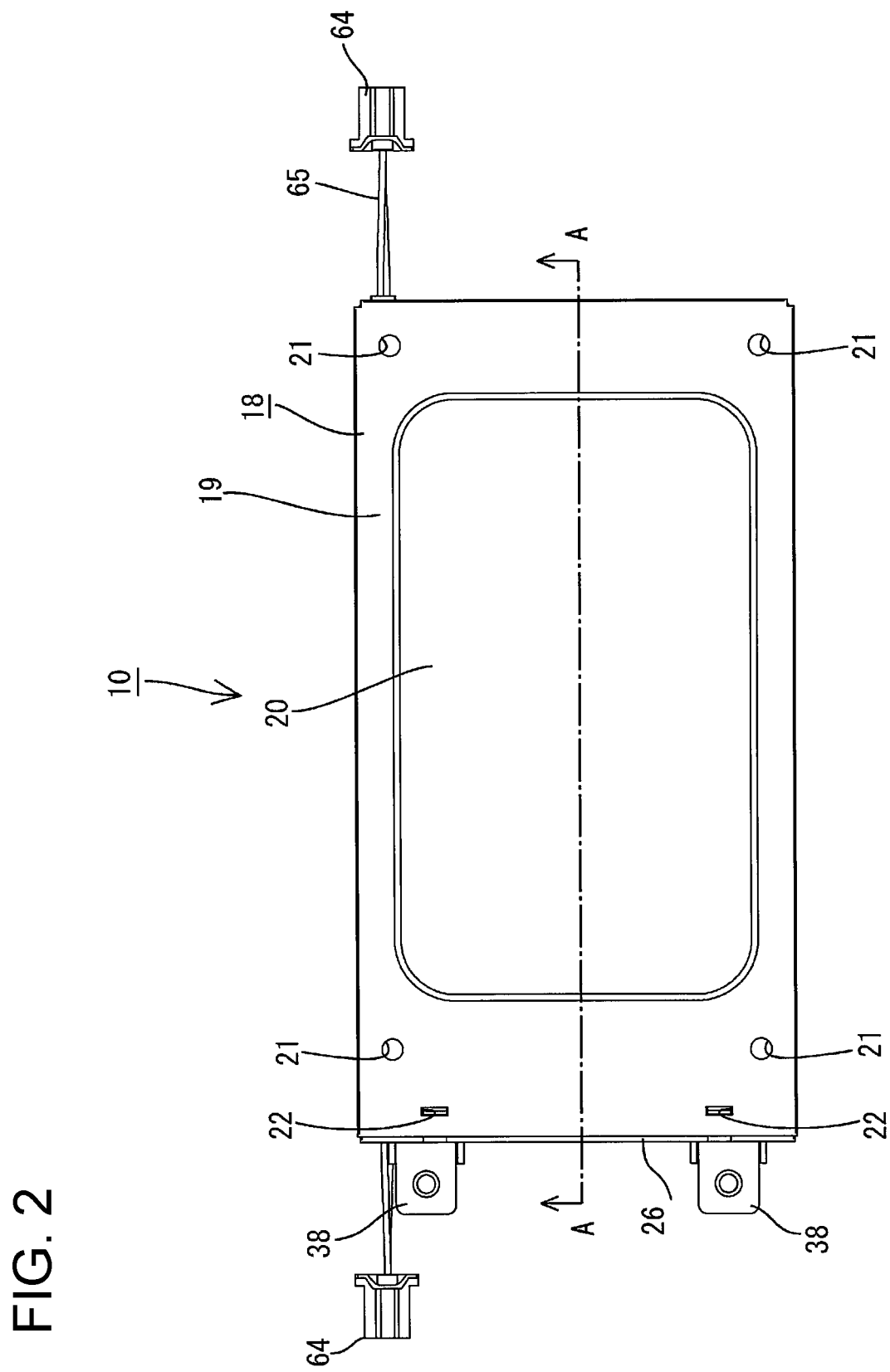
FIG. 2 is a plan view of the electricity storage module.

As shown in FIG. 1, the battery module 10 generally may have an approximate shape of a rectangular parallelepiped. A plurality of wires 65 connected to lead terminals 34 of their respective electric cells 32 (an example of electricity storage elements) are drawn out of the left and right sides, as seen in FIG. 2, (i.e. the front side and the rear side) of the battery module 10. The plurality of wires 65 are each connected at one end to a lead terminal 34 of the respective electric cell 32 via a plate-shaped voltage detection terminal (not shown) and at the other end to a voltage detection output connector 64 (also referred to simply as a "connector 64" hereinafter).

The plurality of connectors 64 connected to the wires 65 drawn out of the front side and the plurality of connectors 64 connected to the wires 65 drawn out of the rear side may be each integrated by being stacked together.

Figure 3:
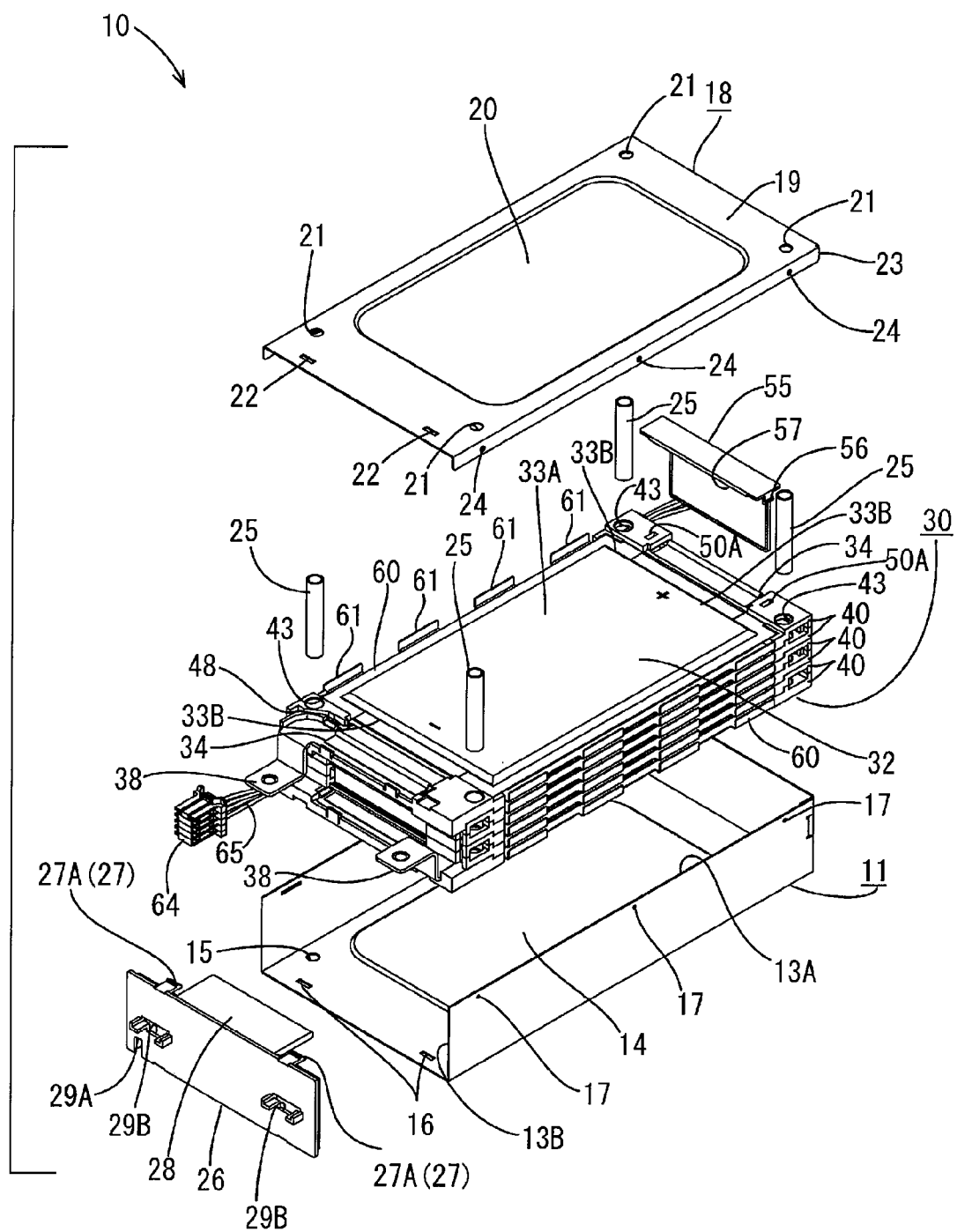
FIG. 3 is an exploded perspective view of the electricity storage module.

As shown in FIG. 3, the battery module 10 may include a stack 30 formed by stacking a plurality of electric cells 32 (six electric cells 32 in this embodiment, though more or less than six may also be appropriate) and a metal case 11 that accommodates the stack 30.

Case 11

The case 11 may include a main case body 12 that accommodates the stack 30 and a lid portion 18 fitted on the opening 13A in the top of the main case body 12.

As shown in FIG. 3, the main case body 12 may be open at the top and the front side. Formed at the top end of the rear side of the main case body 12 may be a wire draw-out hole (not shown) for drawing the plurality of wires 65 out of the case 11.

Formed at the bottom of the main case body 12 may be a protruding surface 14 of an approximately square shape that protrudes inward of the case 11. The protruding surface 14, formed at the bottom of the main case body 12, is capable of coming into contact with a heat-transfer plate 60 disposed below the lowermost electric cell 32. With the protruding surface 14 of the main case body 12 in contact with the electric cell 32, the heat generated by the electric cells 32 may be transferred to the main case body 12 and released to the outside.

Formed through the bottom of the main case body 12 outside of the protruding surface 14 are fixing holes 15 in which first fixing members 25 (to be described below) may be inserted to fix together the stack 30, which is accommodated in the main case body 12, and the lid portion 18. Additionally, rectangular holes 16 may be formed through the front end of the bottom of the main case body 12. These rectangular holes 16 serve as engaging holes 16 that engage and secure an insulation lid portion 26 mounted to the front opening 13B.

Formed on a pair of longitudinal side faces of the main case body 12 may be a plurality (for example, three) of approximately circular fixing holes 17 into which second fixing members (not shown) can be inserted to fix the lid portion 18.

As shown in FIG. 3, the lid portion 18 may include an approximately rectangular plate portion 19 and fixing portions 23 extending approximately orthogonally with respect to the plate portion 19 and fixed at the top end of the main case body 12. Formed at the center of the plate portion 19 may be a protruding surface 20 that protrudes inward (downward). The protruding surface 20 of the lid portion 18 is capable of coming into contact with the uppermost (top-tier) electric cell 32A (an example of a electric cell 32 disposed on an end of the stack 30). With the protruding surface 20 of the lid portion 18 in contact with the electric cell 32, the heat generated by the electric cells 32 is transferred to lid portion 18 and released to the outside.

Formed through the plate portion 19 outside of the protruding surface 20 may be fixing holes 21 in which the first fixing members 25 are disposed so as to fix together the lid portion 18, the stack 30, and the main case body 12. The diameter of the fixing holes 21 may be formed smaller than the outer diameter of the first fixing members 25.

Additionally, rectangular holes 22 may be formed through the front end of the plate portion 19. These rectangular holes 22 may serve as engaging holes 22 that engage and secure the insulation lid portion 26 mounted at the front.

Formed in the fixing portions 23 are a plurality (for example, three) of approximately circular fixing holes 24 into which the second fixing members can be inserted to fix the lid portion 18 to the main case body 12. The fixing portions 23 may be fitted over the pair of sides and the rear side (see FIG. 5).

As shown in FIG. 3, the first fixing members 25 may have a hollow cylindrical shape and may be inserted into circular through-holes 43 provided in holder members 40 (to be described in further detail below) disposed on the widthwise side edge portions 33B (end portions) of the electric cells 32. The first fixing members 25 may also be disposed between the bottom of the main case body 12 and the lid portion 18. During the assembly of the battery module 10, positioning jigs (not shown) are inserted into the fixing holes 15 in the bottom of the main case body 12 and the fixing holes 21 in the lid portions 18 via the hollows of the first fixing members 25.

The first fixing members 25 may fix the main case body 12, the stack 30, and the lid portion 18 together, for example, by press-fitting screws, etc., into the upper and lower ends of the fixing members. Note that the main case body 12 may also be directly fixed to a metal portion of the vehicle body with bolts penetrating the fixing holes 15 in the bottom of the main case body 12, the first fixing members 25, and the fixing holes 21 in the lid portion 18.

Mounted to the opening 13B at the front of the main case body 12 may be an insulation lid portion 26 made of an insulating resin with busbar draw-out ports 29B formed therein so as to draw busbars 38 out of the busbar draw-out ports 29B.

A pair of projecting lugs 27 may project rearward (to the right in FIG. 5) from each of the upper and lower edges of the insulation lid portion 26. Formed at the tip of each projecting lug 27 may be an engaging projection 27A that is engaged and secured by the corresponding engaging hole 16.

An insulation plate portion 28 may protrude rearward from between the pair of projecting lugs 27 at the upper end of the insulation lid portion 26. The insulation plate portion 28 is placed below the lid portion 18.

An approximately rectangular cutout 29A may be formed at the lower edge of the insulation lid portion 26 to draw out the plurality of wires 65.

Stack 30

The stack 30, which is formed by stacking a plurality of electric cells 32, may be accommodated in the case 11. In this embodiment, the stack 30 is formed by stacking a plurality of electric cells 32 that are mounted on heat-transfer plates 60 with retainer members 40 attached thereto (hereinafter referred to as "electric cell units 31").

Electric Cells 32

In each electric cell unit 31, the widthwise side edge portions 33B of the electric cell 32, which has an approximately rectangular shape as seen from above, may be held by the holder members 40 so that the electric cell 32 are mounted on the heat-transfer plates 60 attached to the holder members 40.

As shown in FIGS. 3 and 4, the electric cells 32 may be disposed approximately in parallel with one another so that the outside surfaces having the largest area, i.e., the sides 33A, face upwards and downwards. The adjacent electric cells 32 in the direction of stacking may be positioned so that lead terminals 34 with different polarities oppose one another.

As shown in FIGS. 6-11, each electric cell 32 may be a laminated cell. Each electric cell 32 may include an unillustrated generator element, a laminate film 33 that wraps the generator element and to which the edge portions 33B are fused, lead terminals 34 connected to the generator element and protruding outward from the edge portions 33B (end portions) fused to the laminate film 33.

Lead Terminals 34

Figure 13:
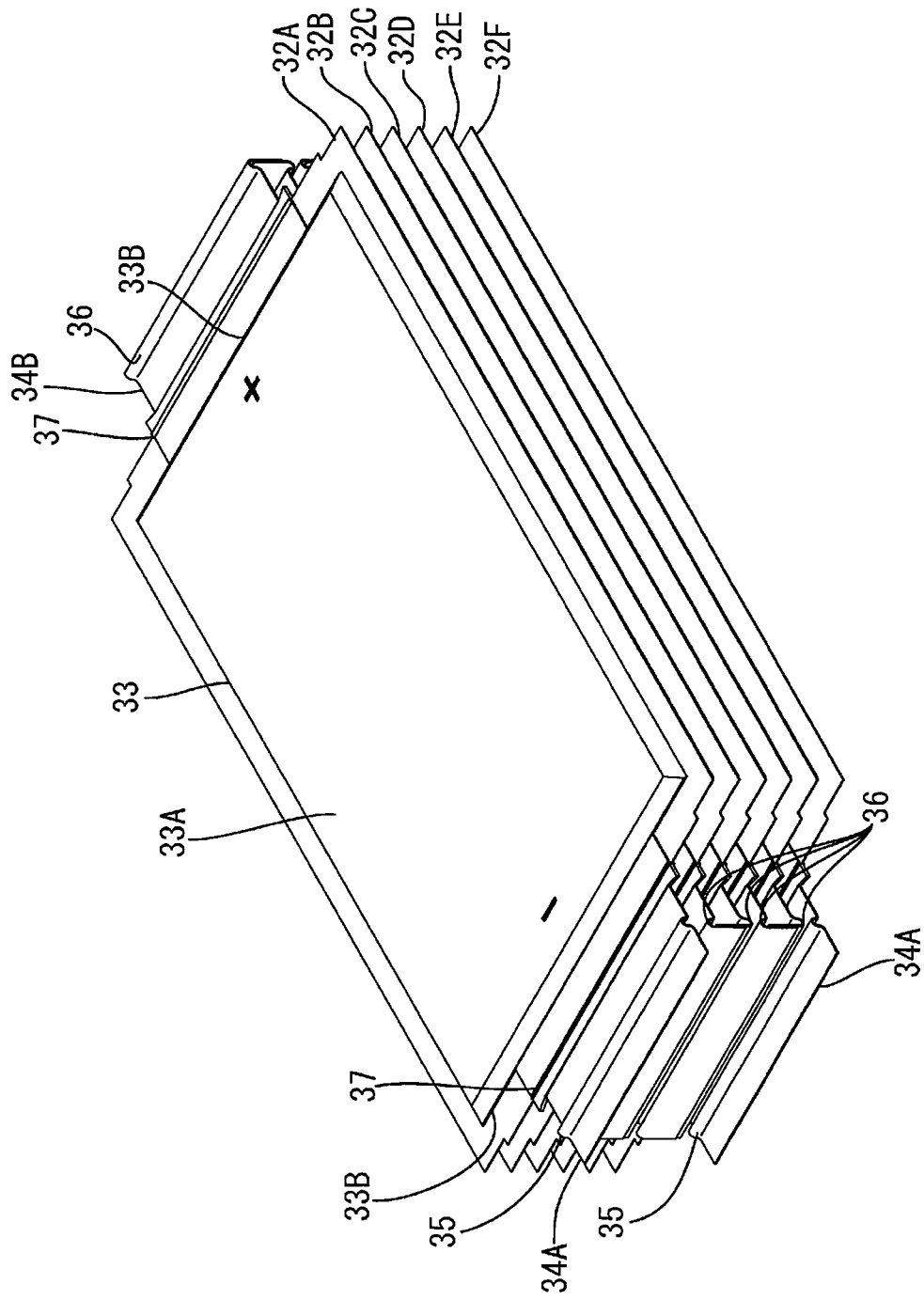
FIG. 13 is a perspective view showing how the electric cells are stacked.
Figure 14:
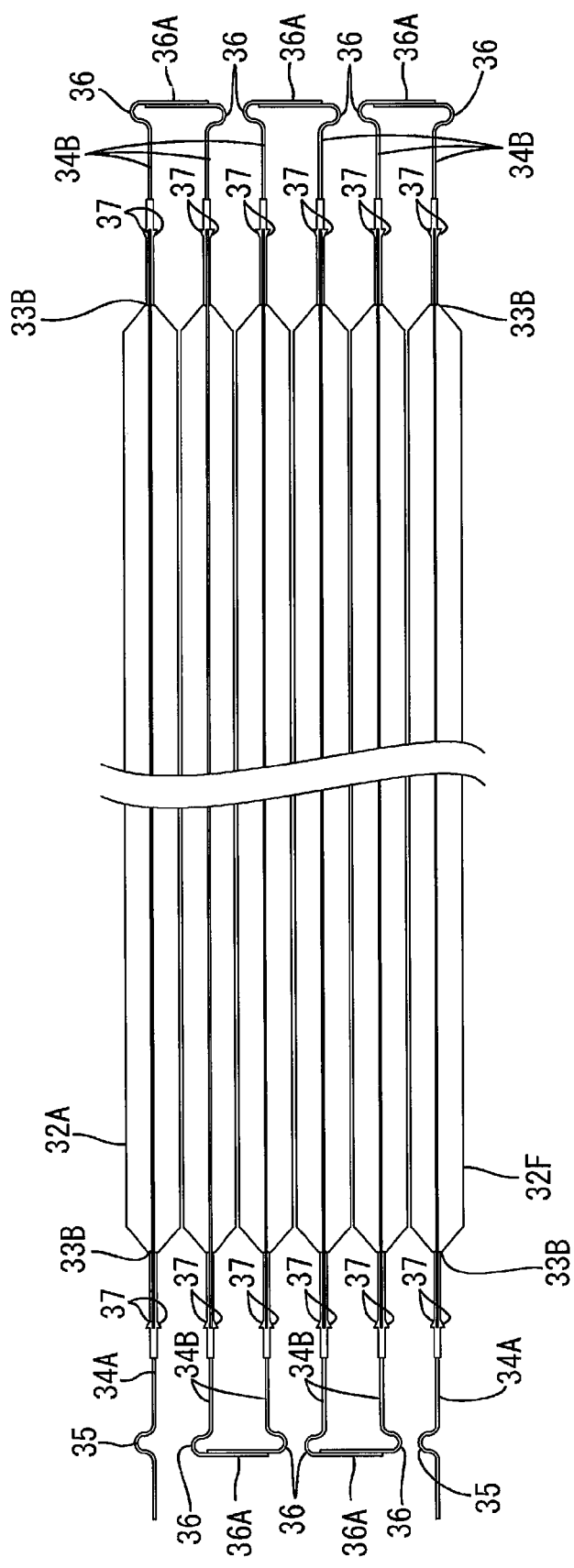
FIG. 14 is a side view showing how the electric cells are stacked.

According to this embodiment, the differently polarized lead terminals 34 of adjacent electric cells 32 may be bent in opposite directions and connected with each other by superimposing and welding their end portions as shown in FIGS. 5, 13, and 14. The lead terminals 34 will now be described in further details. In the drawing, the reference numeral "36A" denotes the connection portion 36A between lead terminals 34.

Figure 6:
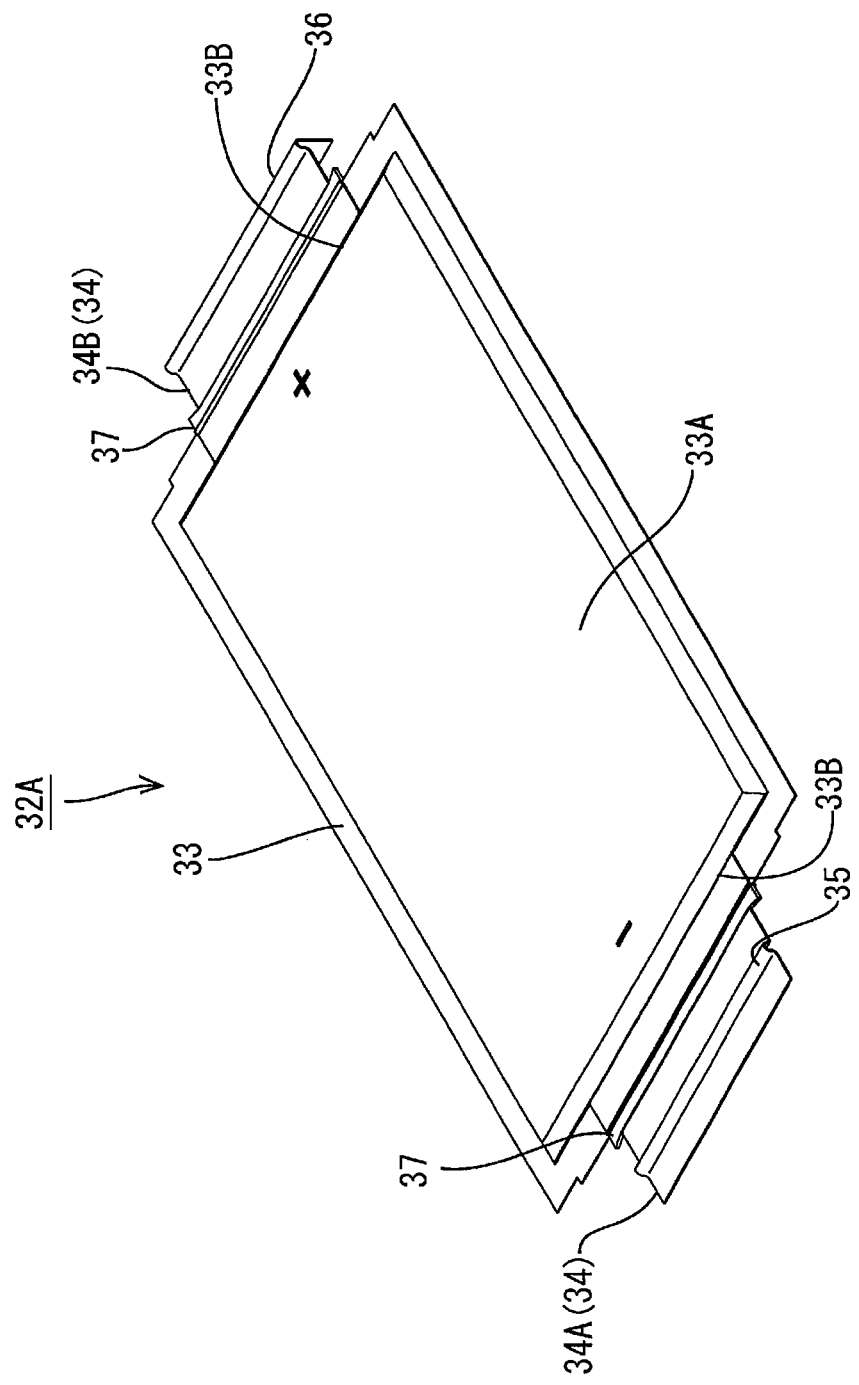
FIG. 6 is a perspective view of the electric cell for the top tier.
Figure 7:
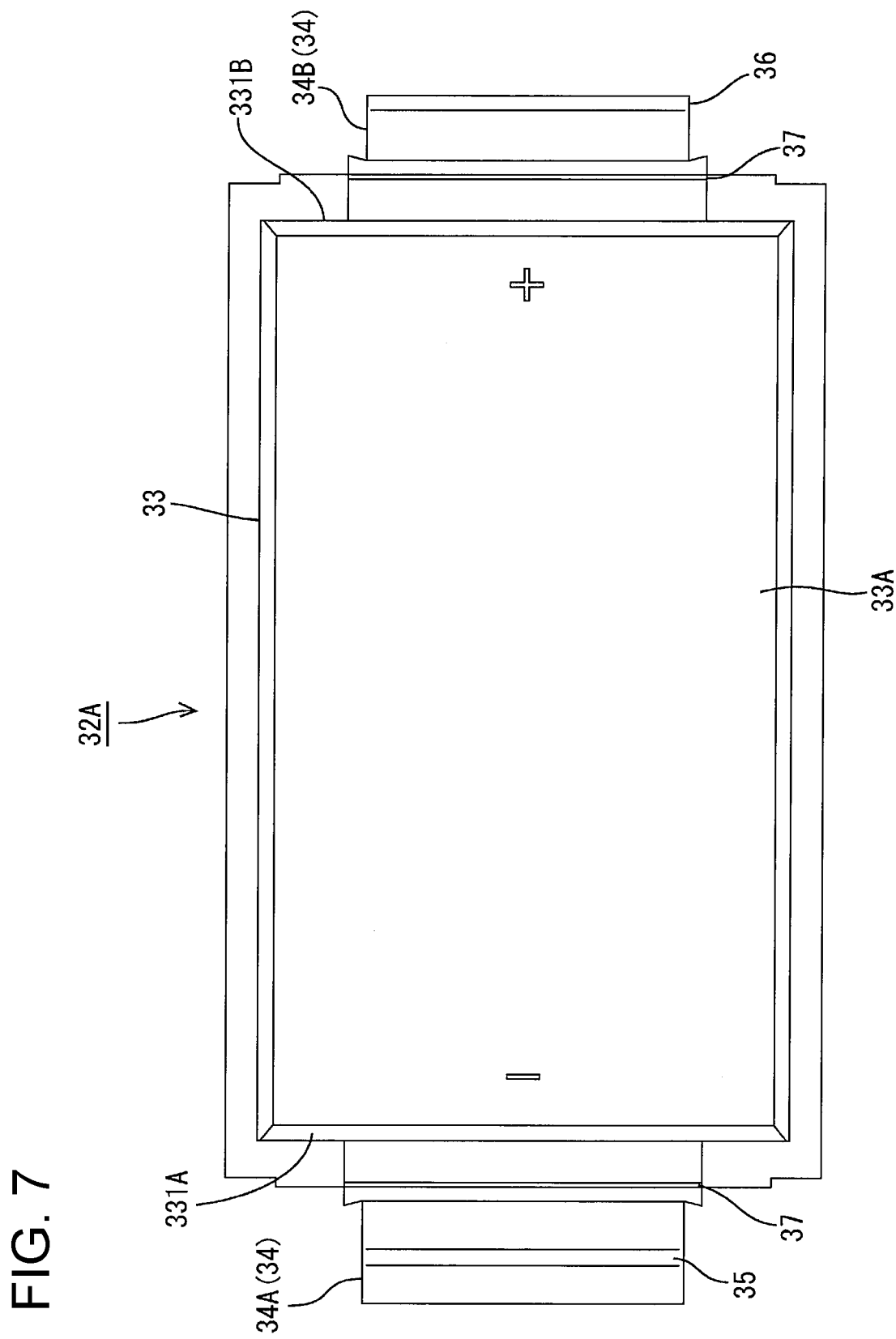
FIG. 7 is a plan view of the electric cell for the top tier.

As shown in FIGS. 6 and 7, the positive lead terminal 34 protruding outward from the right (as seen in the drawing) side edge portion 331B of the top-tier electric cell 32A (an example of the terminal of the electric cell) may be provided with an arcuate protrusion 36 as seen from the side and then bent approximately vertically downward, forming a J-shaped end portion as seen from the side. This lead terminal 34 (34B) may be connected to the negative lead terminal 34B of the second-tier electric cell 32B (also referred to as "inter-terminal connecting terminals 34B").

The negative lead terminal 34 protruding from the left (as seen in the drawing) side edge portion 331A of the top-tier electric cell 32A may be formed with a U-shaped protrusion 35 as seen from the side. The portion distal to the U-shaped protrusion 35 (the end portion) may be approximately parallel with the direction of protrusion (i.e., has a linear shape). This lead terminal 34 (34A) may be directly superimposed on and connected to the busbar 38 (also referred to as the "busbar connecting terminal 34A").

Figure 8:
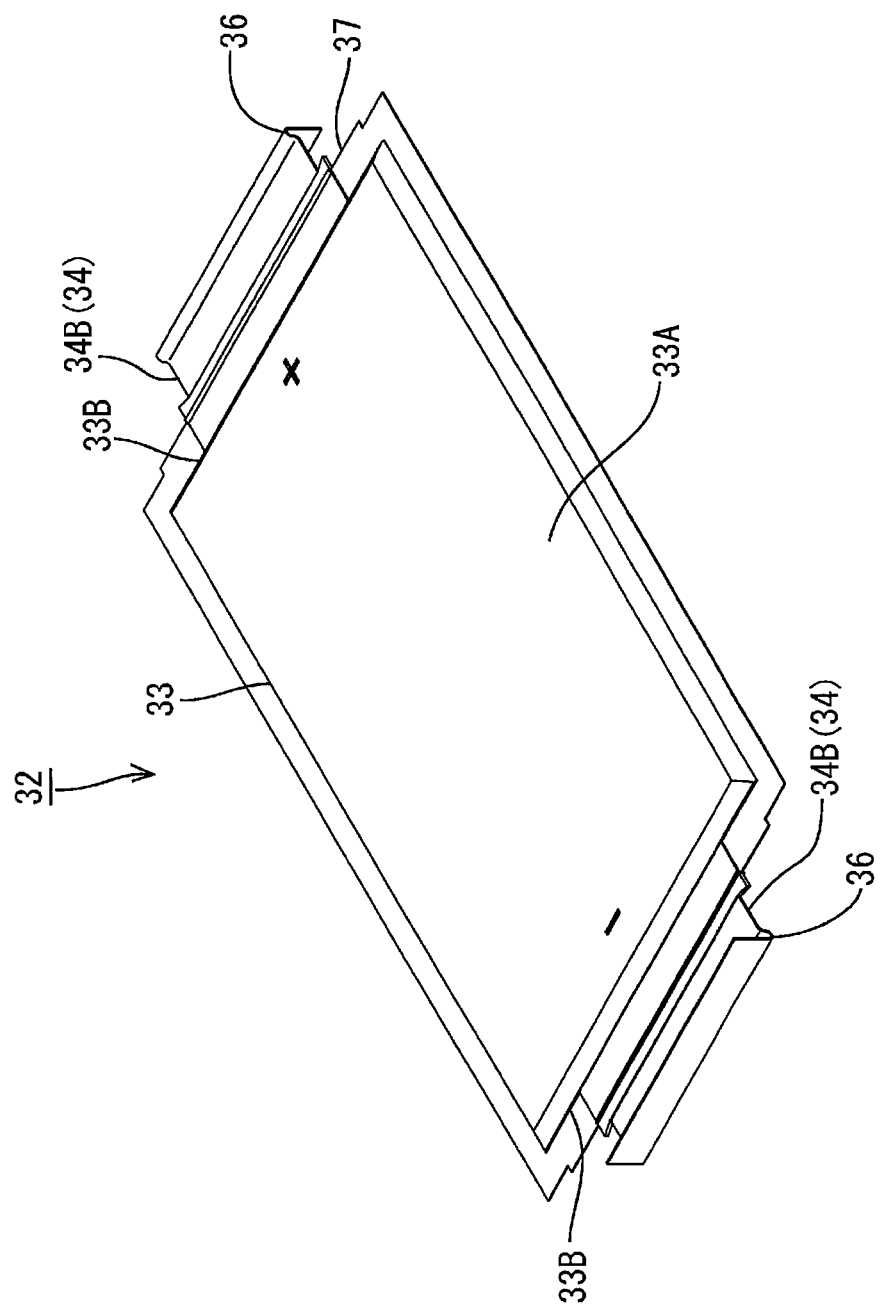
FIG. 8 is a perspective view of the electric cell for the second to fifth tiers.
Figure 9:
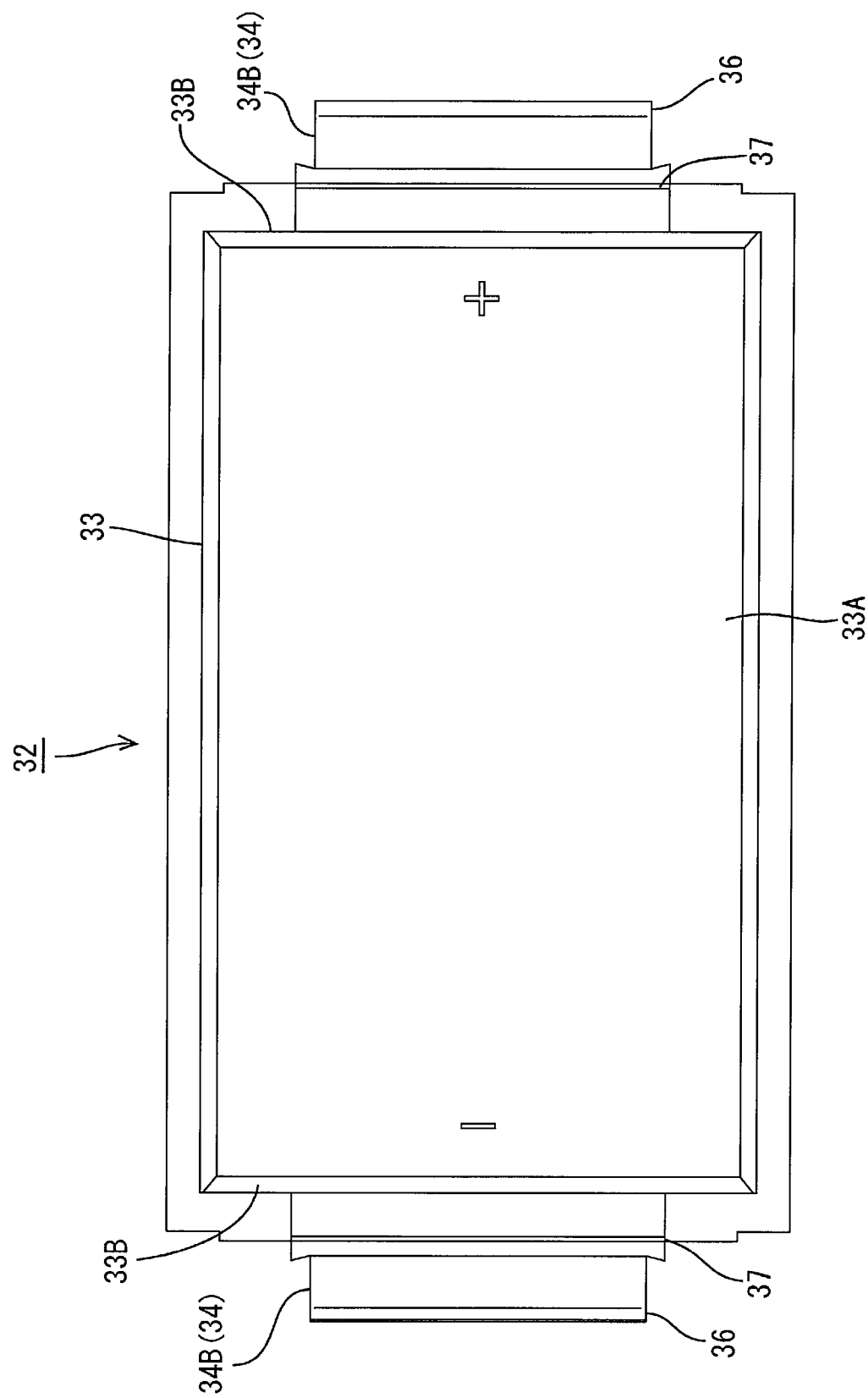
FIG. 9 is a view showing one side of the electric cell for the second to fifth tiers.

As shown in FIGS. 8 and 9, the lead terminal 34 protruding outward from one of the side edge portions 33B of the second- to fifth-tier electric cells 32 (32B, 32C, 32D, and 32E) and the lead terminal 34 protruding outward from the other side edge portion 33B may be bent in opposite directions from each other.

The positive and negative lead terminals 34 of the second- to fifth-tier electric cells 32B, 32C, 32D, and 32E may both be provided with an arcuate protrusion 36 as seen from the side and then bent approximately vertically, forming a J-shaped end portion as seen from the side. These lead terminals 34 (34B) may be connected to differently polarized lead terminals 34B of adjacent electric cells 32 (also referred to as "inter-terminal connecting terminals 34B").

Figure 10:
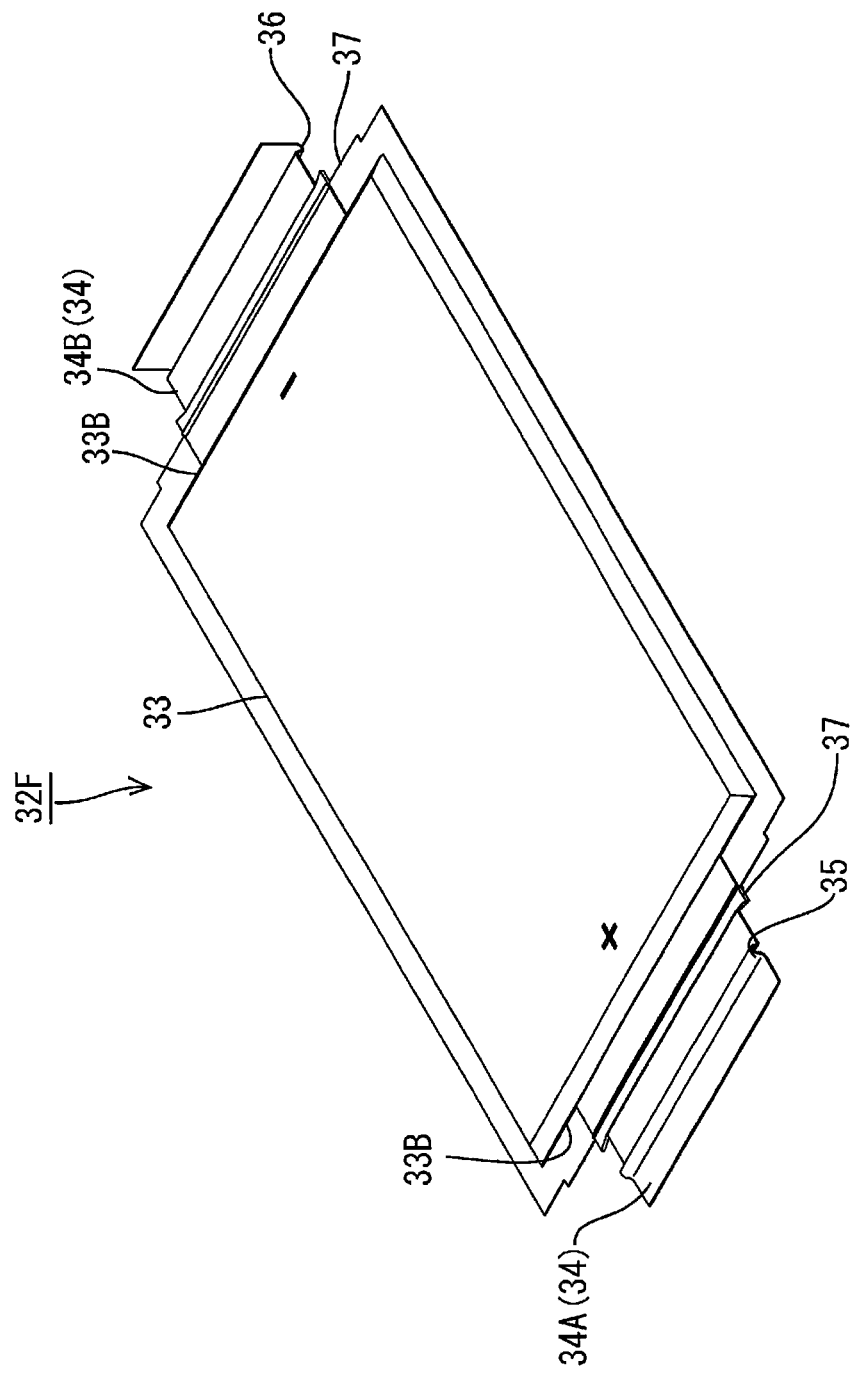
FIG. 10 is a perspective view of the electric cell for the sixth tier.
Figure 11:
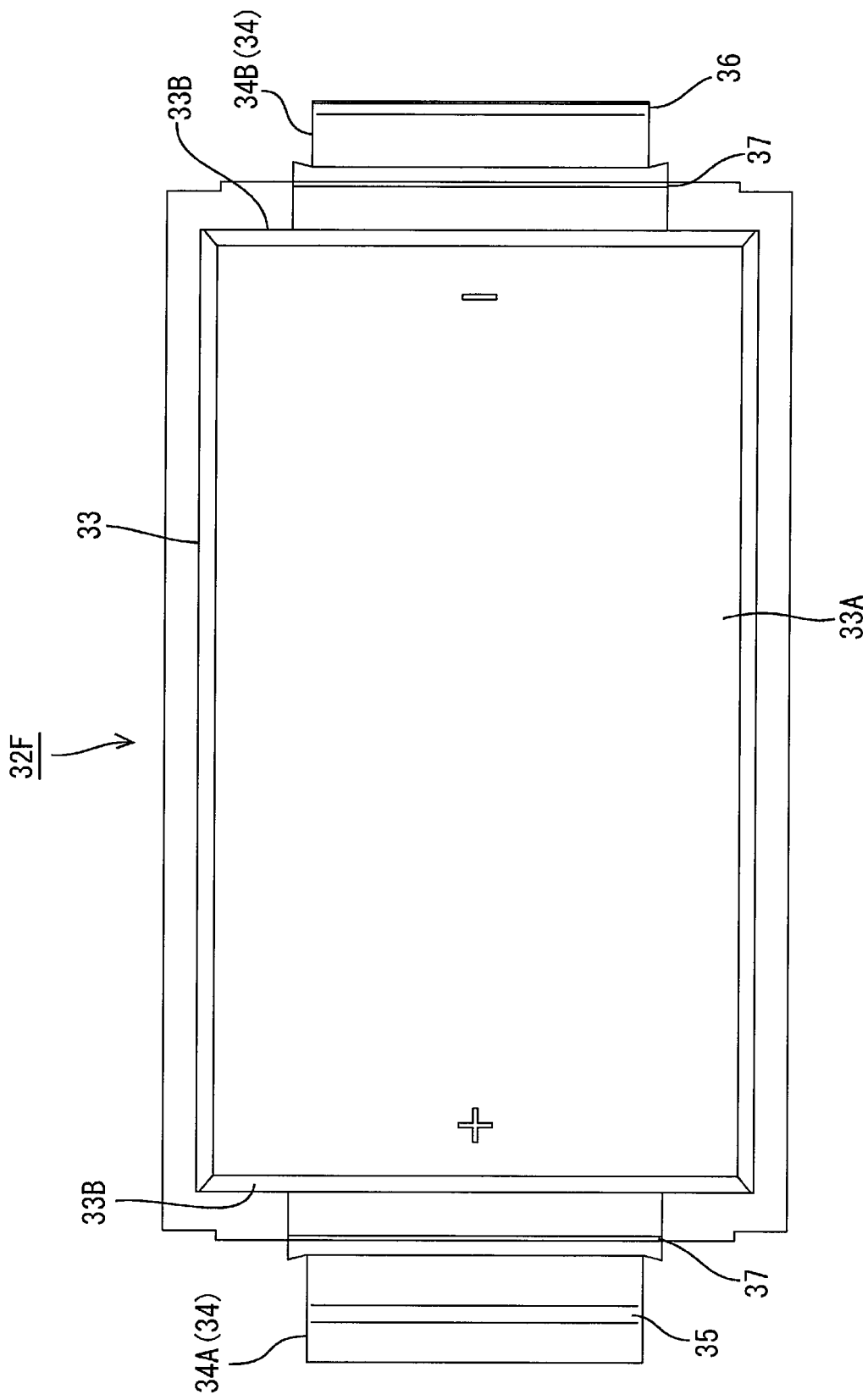
FIG. 11 is a plan view of the electric cell for the sixth tier.
Figure 12:
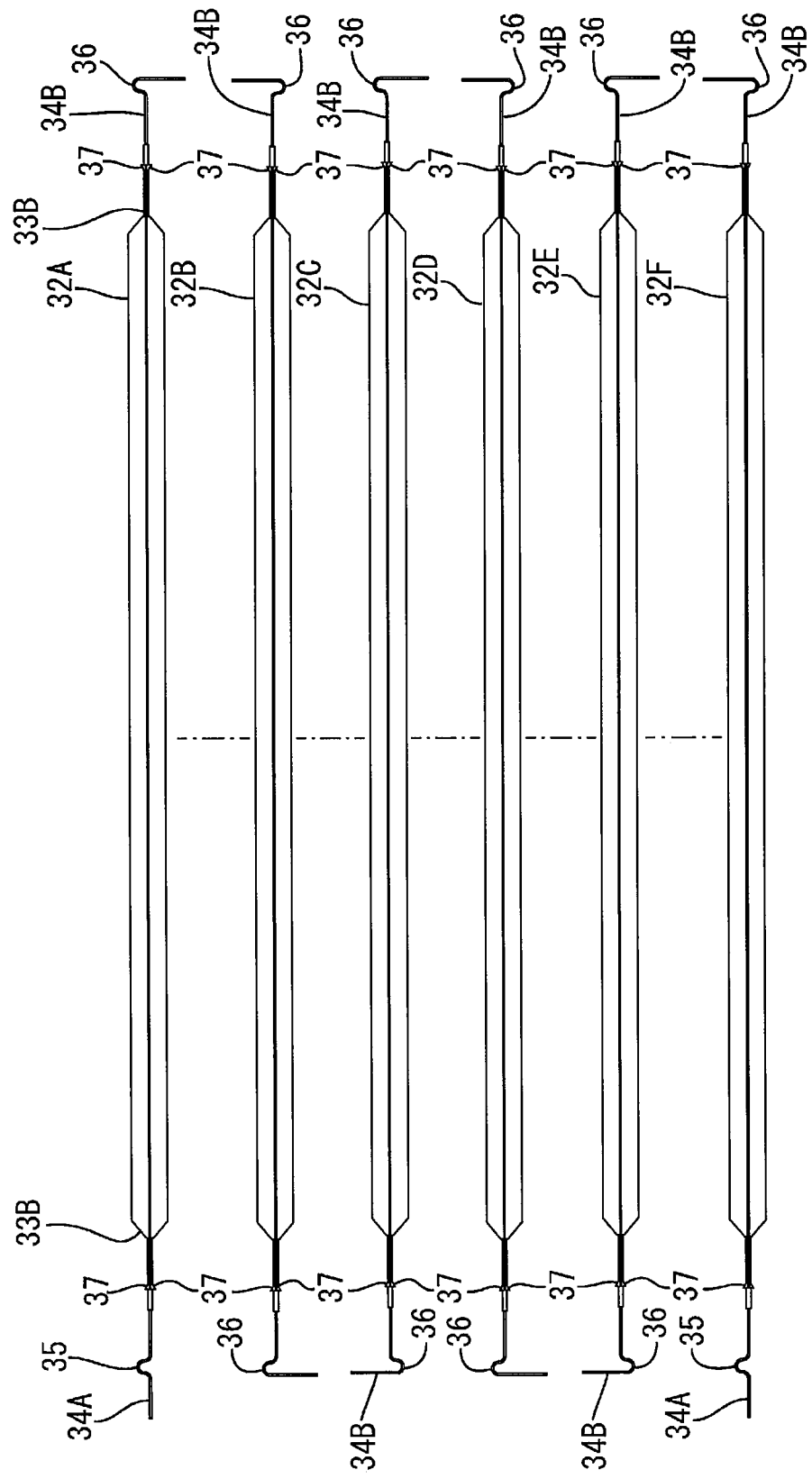
FIG. 12 is a side view showing the arrangement of the electric cells.

As shown in FIGS. 10 and 11, the negative lead terminal 34 protruding from the right side edge portion 33B of the sixth-tier (lowermost) electric cell 32F is provided with an arcuate protrusion 36 as seen from the side and then bent approximately vertically upward, forming a J-shaped end portion as seen from the side. This lead terminal 34 (34B) may be connected to the positive lead terminal 34B of the fifth-tier electric cell 32E (inter-terminal connecting terminals 34B).

The positive lead terminal 34 protruding from the left side edge portion 33B, as seen in the drawing, of the sixth-tier electric cell 32F may be formed with a U-shaped protrusion 35 as seen from the side. The portion distal to the U-shaped protrusion 35 (the end portion) may be approximately parallel with the direction of protrusion (i.e., has a linear shape). This lead terminal 34 (34A) may be directly superimposed on and connected to the busbar 38 (busbar connecting terminal 34A).

The lead terminals 34B (inter-terminal connecting terminals 34B) may be joined to differently polarized lead terminals 34B (inter-terminal connecting terminals 34B) of adjacent electric cells 32 by superimposing their distal linear portions on each other to bring them into mutual contact. As shown in FIG. 5, the arcuate protrusions 36 may be positioned vertically by connecting the inter-terminal connecting terminals 34B.

The arcuate protrusions 36 of lead terminals 34B are capable of reducing the stress applied to the lead terminals 34B when these lead terminals 34B are welded together (the arcuate protrusions 36 being an example of a stress reducing portion). Note that the U-shaped protrusions 35 of the lead terminals 34A serve to lessen the stress applied to the lead terminals 34A when the lead terminals 34A and the busbars 38 are connected.

It should be noted that in each lead terminal 34, as shown in FIG. 5, engaging portions 37 that protrude upward and downward to be engaged and secured by the holder members 40 may be formed between each edge portions 33B of the laminate film 33 and the protrusions 35 and 36.

Busbar 38

The busbar 38 connected to the uppermost electric cell 32A may be a terminal 38B that serves as the anode of the battery module 10. A busbar 38 connected to the lowermost electric cell 32F may be a terminal 38A that serves as the cathode of the battery module 10. Each busbar 38 may be made of a conductive material, such as pure aluminum, aluminum alloy, copper, or copper alloy.

Holder Members 40

Each electric cell 32 may be mounted on a heat-transfer plate 60 and held by holder members 40 made of an insulating resin. The holder members 40 may be disposed on the edge portions 33B (end portions), from which the lead terminals 34 of the electric cell 32 protrude.

Recesses 41 may be formed in the lower surfaces of the holder members 40 except for the lowermost holder members 40, and protrusions 42 that fit in the recesses 41 of the holder members 40 immediately above may be formed on the top surfaces of the holder members 40 except for the uppermost holder members 40. In this way, when the plurality of holder members 40 are vertically stacked, the protrusions 42 can fit into the recesses 41 of the vertically adjacent holder members 40 for integration.

Additionally, in this embodiment, when the plurality of holder members 40 are stacked together, spaces S may be formed between the vertically adjacent holder members 40 as shown in FIG. 4.

More specifically, both the lower surface of the protrusion 42 of the holder member 40B, which is disposed at the front of the second tier, and the top surface of the holder member 40C, which is positioned immediately below the protrusion 42 of the holder member 40B, may be recessed such that when these two holder members 40B and 40C are stacked together, a space S is created between the holder members 40B and 40C, extending approximately parallel in with the widthwise direction of the laminate films 33 of the electric cells 32.

Similarly, spaces S may be created between the holder member 40D disposed at the front of the fourth tier and the holder member 40E disposed at the front of the fifth tier, between the holder member 40G disposed at the rear of the top tier and the holder member 40H disposed at the rear of the second tier, between the holder member 40I disposed at the rear of the third tier and the holder member 40J disposed at the rear of the fourth tier, and between the holder member 40K disposed at the rear of the fifth tier and the holder member 40L disposed at the rear of the sixth tier.

Positioned in spaces S between the vertically adjacent holder members 40 may be the connection portions 36B between the vertically adjacent lead terminals 34B of different polarities. A jig 70 for welding the adjacent lead terminals 34B of different polarities can be inserted into spaces S. As shown in FIG. 4, insertion ports 71 at which the jig 70 is inserted into spaces S may be provided in the front side surfaces and the rear side surfaces of the holder members. Accordingly, the jigs 70 can be inserted transversely across the direction in which the lead terminals 34 protrude (in parallel with the longitudinal direction of the laminate films 33).

Each holder member 40 may be provided with through-holes 43 (for example, two through-holes) into which first fixing members 25 can be inserted, a heat-transfer plate fixing portion (not shown) that fixes a heat-transfer plate 60, and a terminal mount 45 on which a lead terminal 34 of the electric cell 32 is mounted. Provided in the terminal mount 45 of the holder member 40 may be an engaging groove(s) 46 for receiving and securing the engaging portions 37 of the lead terminals 34.

Of the plurality of holder members 40, each of the holder member 40A at the front of the top tier, the holder member 40C at the front of the third tier, the holder member 40E at the front of the fifth tier, the holder member 40F at the front of the sixth tier, the holder member 40H at the rear of the second tier, the holder member 40J at the rear of the fourth tier, and the holder member 40L at the rear of the sixth tier may have formed therein a mounting portion (not shown) on which a voltage detection terminal is mounted and a wire accommodating groove 48 that accommodates the wire 65 connected to the voltage detection terminal.

In the two holder members 40F and 40L disposed at the sixth tier (the lowermost tier), one engaging groove 46 may be provided only in the top surface. However, an engaging groove 46 is provided on both of the top and lower surfaces in the other holder members 40.

Furthermore, a busbar holder portion 49 for holding a busbar 38 may be formed in each of the holder member 40A disposed at the front of the top tier and the holder member 40F disposed at the front of the sixth tier. Formed in each busbar holder portion 49 may be a recess 49A in which the busbar 38 is fitted and a retainer protrusion 49B that prevents the busbar 38 fitted in the recess 49A from slipping out.

Additionally, provided in the holder member 40G at the rear of the top tier may be engaging holes 50A that receive and secure the engaging lugs 56 of a stack holder member 55 (to be described below) and a mounting recess 50B that receives the mounting protrusion 57 of the stack holder member 55.

The stack holder member 55 may be an L-shaped member mounted on the rear end of the stack 30 to hold the stack 30. The stack holder member 55 may include engaging lugs 56 engaged and secured by the engaging holes 50A of the holder member 40G at the rear of the top tier and also a mounting protrusion 57 that receives the mounting recess 50B of the holder member 40.

Heat-Transfer Plate 60

In this embodiment, heat-transfer plates 60 made of aluminum or aluminum alloy may be interposed between the adjacent electric cells 32. Four upright walls 61 are vertically erected at intervals on the pair of longitudinal side edges of each heat-transfer plate 60. These upright walls 61 may be heat conductive walls 61 positioned to come into contact with the inner wall surfaces of the case 11 when the stack 30 is accommodated in the case 11 so as to conduct the heat generated by the electric cells 32 to the case 11. Heat generated by the electric cells 32 may be conducted to the case 11 via the heat conductive walls 61 and released to the outside of the case.

Formed inside of the pair of the longitudinal side edges of each heat-transfer plate 60 may be U-shaped grooves in a cross-section (not shown) that extend in approximate parallel with the longitudinal side edges. Elastic deformation of these two grooves brings the heat conductive walls 61 into contact with the inner walls of the case 11 at high contact pressure, thus ensuring sufficient heat conduction.

In this embodiment, in the normal conditions, the distance between the opposing heat conductive walls 61 may be set the same as or slightly larger than the distance between the inner wall surfaces 12A of the pair of sides provided at the front and rear of the main case body 12. The heat-transfer plates 60 have unillustrated fixing holes and are fixed to the holder members 40 by fitting fixing protrusions (not shown) of the holder members 40 into these fixing holes.

Assembly of the Battery Module 10 of the Embodiment

In the embodiment, one unit of the electric cell 32A shown in FIG. 6, four units of the electric cell 32 shown in FIG. 8, and one unit of the electric cell 32F shown in FIG. 10, (i.e. six electric cells 32 altogether), are prepared. FIG. 12 shows the order of arrangement of the six electric cells 32.

Holder members 40 may be attached to the six heat-transfer plates 60 in advance by fitting the fixing protrusions of the holder members 40 into the respective fixing holes of the heat-transfer plates 60 and performing heat crimping.

Next, the wires 65 to which the connectors 64 are connected may be attached to the holder members 40, the holder members 40 having a wire accommodating groove 48, and the busbars 38 are attached to the holder members 40, the holder members 40 including a busbar holder portion 49. More specifically, the wires 65 to which the connectors 64 are connected (also referred to as connector-attached wires 65) are attached by mounting voltage detection terminals on the mounting portions 47 of the holder members 40 and placing the wires 65 in the wire accommodating grooves 48.

The busbars 38 may be assembled as described below. By inserting a busbar 38 into the recess 49A of a busbar holder portion 49, the busbar 38 may be brought into abutment with the retainer protrusion 49B, causing the retainer protrusion 49B to deform outward. When the busbar 38 is fitted into the recess 49A, the retainer protrusion 49B may elastically return to restrict the upward movement of the busbar 38 and prevents it from slipping out.

Next, the electric cells 32 may be mounted on the heat-transfer plates 60, to which the holder members 40 may be attached. Specifically, the electric cell 32A shown in FIG. 6 may be mounted on the heat-transfer plate 60 to which the holder member 40A with a busbar holder portion 49 is attached, whereas the electric cell 32F shown in FIG. 10 may be mounted on the heat-transfer plate 60 to which the holder member 40F with a busbar holder portion 49 is attached. The electric cell 32 shown in FIG. 8 may be mounted on the other heat-transfer plates 60.

The electric cells 32A, 32F may be mounted on the two heat-transfer plates 60 to which the holder members 40A and 40F with a busbar holder portion 49 are attached, with the lead terminal 34A (the busbar connecting terminal 34A) being disposed on the same side as the busbar holder portion 49, so as to fit the engaging portions 37 of each lead terminal 34 into the engaging grooves 46 of the terminal mounts 45.

Likewise, an electric cell 32 may be mounted on the other heat-transfer plates 60 so that the engaging portions 37 of each lead terminal 34 are fitted into the engaging grooves 46 of the terminal mounts 45. In this way, a plurality (for example, six) of battery units 31 are prepared.

The six battery units 31 may be stacked in order, starting with the lowermost tier. The battery units 31 are stacked together by aligning the recesses 41 formed in the lower surfaces of the holder members 40 at the second lowest tier (for example, the fifth tier) with the protrusions 42 formed on the top surfaces of the holder members 40 at the lowermost tier. Once the six battery units 31 may be stacked by repeating the same process, the protrusions 42 of the holder members 40 may be fitted in the recesses 41 of the vertically adjacent holder members 40 for integration, thus providing a stack 30 as shown in FIG. 4. Then, the through-holes 43 in the six tiers of stacked holder members 40 may be aligned with one another to provide continuous through-holes while forming spaces S between the adjacent holding members.

Figure 15:
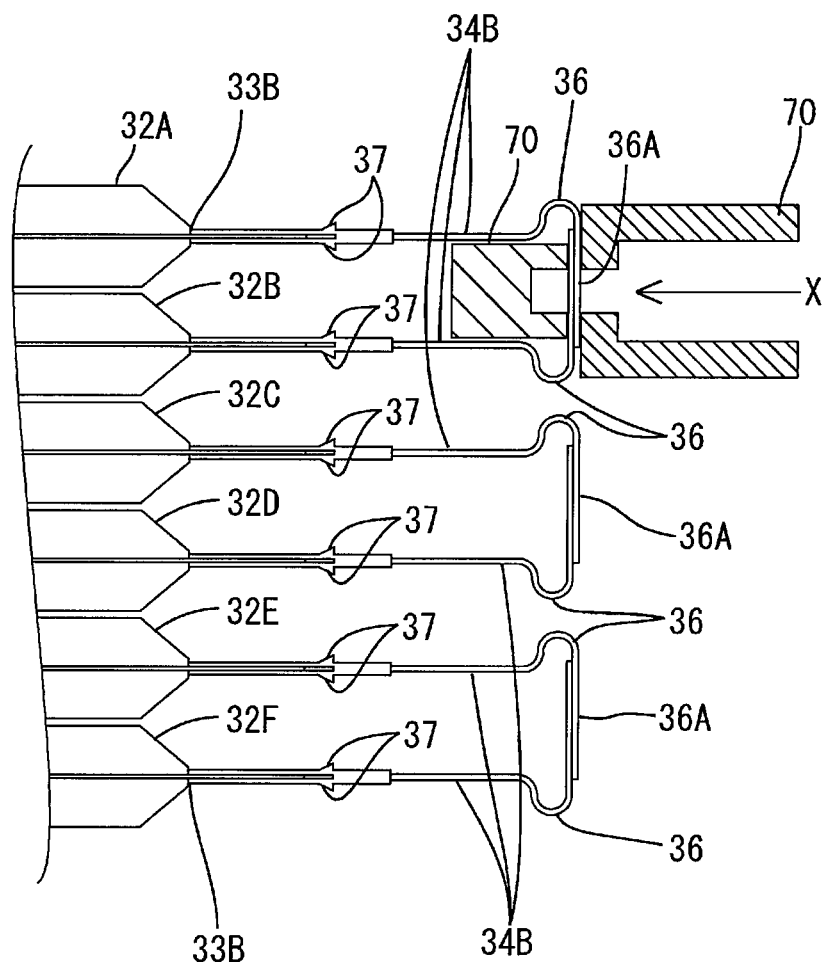
FIG. 15 is a schematic view showing how the lead terminals are welded.

Next, a welding jig is inserted into the space S between the vertically adjacent holding members 40 to weld together the end portions (the liner portions) of the pairs of vertically adjacent lead terminals 34B. FIG. 15 is a view schematically showing the welding operation, with the holder members omitted from the view. As shown in FIG. 15, the overlapping end portions of two lead terminals 34B are pinched between a pair of jigs 70 inserted transversely across the direction in which the lead terminals 34 protrude, and the adjacent lead terminals 34B of different polarities are joined together by applying a laser beam from the direction indicated by "X" in FIG. 15 for welding.

The stack holder member 55 may be attached to the rear end of the stack 30 thus obtained. The stack 30 may be held in place by inserting the mounting protrusion 57 of the stack holder member 55 into the mounting recess 50B of the holder member 40G at the rear of the top tier and with the engaging lugs 56 of the stack holder member 55 in the engaging holes 50A of that holder member 40.

Subsequently, the connector-attached wires 65 to be drawn out of the rear of the stack 30 may be drawn out through the wire draw-out hole formed in the upper end of the rear side of the main case body 12, thus accommodating the stack 30 in the main case body 12. In this embodiment, in the normal conditions, the distance between the heat conductive walls 61 on the heat-transfer plates 60 may be set the same as or slightly larger than the distance between the inner wall surfaces 12A of the pair of sides provided at the front and rear of the main case body 12. Accordingly, due to abutment of the heat conductive walls 61 against the inner wall surfaces 12A of the main case body 12, the grooves 62 in the heat-transfer plates 60 are elastically deformed in such a direction as to reduce the distance between the heat conductive walls 61. Once the stack 30 is accommodated, the heat conductive walls 61 may come into elastic contact with the inner wall surfaces 12A of the main case body 12.

The insulation lid portion 26 may then be fitted on the opening 13B at the front of the main case body 12. Specifically, the connector-attached wires 65 to be drawn out of the front of the stack 30 may be drawn out through the cutout 29 in the insulation lid portion 26, and the busbars 38 are drawn out of the busbar draw-out ports in the insulation lid portion 26. Additionally, the pair of engaging projection 27 formed at the lower end of the insulation lid portion 26 may be fitted and secured in the engaging holes 16 formed in the bottom plate of the main case body 12. This attaches the insulation lid portion 26 to the main case body 12 with the insulation plate portion 28 set on the top of the stack 30.

Subsequently, the lid portion 18 may be fitted on the opening 13A at the top of the main case body 12. A battery module 10 as shown in FIG. 1 is obtained by engaging the pair of engaging projections 27 formed at the top end of the insulation lid portion 26 with the engaging holes 22 in the lid portion 18 to cover the top of the main case body 12 with the lid portion 18.

Next, with the first fixing members 25 passed through the through-holes 43 of the holding members 40 at the ends of the stack 30 between the lid portion 18 and the bottom wall of the main case body 12, the fixing holes 21 of the lid portion 18, the hollow first fixing members 25, and the fixing holes 15 in the bottom wall of the main case body 12 may be inserted into unillustrated jigs for alignment and then the lid portion 18 and the main case body 12 are fastened with screws or pins. This completes the assembly of the battery module 10.

The operation and effects of this embodiment will be described hereafter.

In this embodiment, as the differently polarized lead terminals 34B of the adjacent electric cells 32 are bent in opposite directions, the end portions of the lead terminals 34B may overlap each other by orienting an end portion of a lead terminal 34B of one electric cell 32 toward the other electric cell 32 and orienting an end portion of a lead terminal 34B of that other electric cell 32 toward the first electric cell 32 (see FIG. 14). Additionally, as shown in FIG. 15, the differently polarized (reversely polarized) lead terminals 34B of two adjacent electric cells 32 are connected with one another by welding together the overlapping end portions of two lead terminals 34B.

As a result, according to this embodiment, the length along the direction of protrusion of the lead terminals 34 of the electric cells 32 can be shortened by the length from the bends of the lead terminals 34B to the distal ends, thus allowing for downsizing of the battery module 10 formed by stacking such electric cells 32.

Moreover, according to this embodiment, as the lead terminals 34B are provided with protrusions 36 that lessen the stress applied to the lead terminals 34B when they are welded together (stress reducing portions), the stress of welding may be lessened, thus limiting the reduction in strength of the lead terminals 34B caused by the stress applied.

Furthermore, according to this embodiment, as the differently polarized lead terminals 32B of the adjacent electric cells 32 are connected by laser welding, minute and precision welding is possible.

Further, in this embodiment, the portions of the lead terminals 34B from the bends to the distal ends are directed transversely across the direction in which the lead terminals 34 protrude. Formed between the holder members 40 that hold the electric cells 32 are insertion ports S, into which jigs 70 for welding the differently polarized lead terminals 34B of the adjacent electric cells 32 can be inserted transversely across the direction of the protrusion of the lead terminals 34.

As such, according to this embodiment, as the welding jig 70 can be inserted into the insertion holes 71 between the holder members 40 from a direction transverse to the direction in which the lead terminals 34 protrude, the lead terminals 34 can be welded after the holder members 40, which maintain the insulation between the electric cells 32, are attached.

Other Embodiments

The present invention is not limited to the embodiments described in connection with the foregoing description and drawings. For example, the following embodiments also fall under the technical scope of the present invention.

(1) Although the foregoing embodiment has been shown to have a U-shaped protrusion 35 and arcuate protrusions 36 as stress reducing portions 35, 36, the geometry of the stress reducing portions is not limited to these. Additionally, lead terminals with no stress reducing portions may also suffice.

(2) Although the foregoing embodiment shows an example in which the differently polarized lead terminals 34 of adjacent electric cells 32 are connected by laser welding, they may be connected by a different welding method, such as resistance welding, etc.

(3) The foregoing embodiment shows an example that has holder members 40 in which insertion ports 71 into which jigs 70 for welding together the differently polarized lead terminals 34 of adjacent electric cells 32 can be inserted from a direction transverse to the direction of the protrusion of the lead terminals 34. However, holder members may not be provided.

(4) Although the foregoing embodiment shows heat-transfer plates 60 with heat conductive walls 61 that can come into elastic contact with the inner walls 12A of the case 11, the heat conductive walls do not need to come into elastic contact as long as they come into contact with the case's inner walls.

(5) Although the foregoing embodiment shows an example in which the electricity storage elements 12 are batteries, they may be capacitors.

(6) Although the foregoing embodiment shows laminated batteries as an example of the electricity storage elements 12, they may also be batteries formed by accommodating generator elements in a metal battery case.

(7) Although the foregoing embodiment shows an example used as a battery module 10 for ISG's, it can also be used as a battery module for other applications.

LIST OF REFERENCE NUMERALS

10 . . . Battery module (electricity storage module)
30 . . . Stack
31 . . . Battery unit
32 . . . Electric cell (electricity storage element)
32A, 32B, 32C, 32D, 32E, 32F . . . Electric cells (electricity storage elements)
33 . . . Laminate film
33B . . . Edge portion (end portion of electric cell)
34 . . . Lead terminal
34A . . . Busbar connecting terminal (lead terminal)
34B . . . Inter-terminal connecting terminal (lead terminal)
35 . . . U-shaped protrusion
36 . . . Arcuate protrusion (stress reducing portion)
36A . . . Connection portion
40 . . . Holder member
40A . . . Holder member at the front of the top tier
40B . . . Holder member at the front of the second tier
40C . . . Holder member at the front of the third tier
40D . . . Holder member at the front of the fourth tier
40E . . . Holder member at the front of the fifth tier
40F . . . Holder member at the front of the sixth tier
40G . . . Holder member at the rear of the top tier
40H . . . Holder member at the rear of the second tier
40I . . . Holder member at the rear of the third tier
40J . . . Holder member at the rear of the fourth tier
40K . . . Holder member at the rear of the fifth tier
40L . . . Holder member at the rear of the sixth tier
70 . . . Jig
71 . . . Insertion hole
S . . . Space

The invention claimed is:

1. An electricity storage module comprising:
a stack formed by stacking a plurality of electricity storage elements having positive and negative lead terminals that protrude outward from end portions thereof,
wherein differently polarized lead terminals of adjacent ones of the electricity storage elements are bent in opposite directions and connected by superimposing and welding together end portions thereof,
wherein the electricity storage module further comprises a plurality of holder members made of an insulating resin for holding the electricity storage elements,
wherein the plurality of holder members are provided with insertion ports into which jigs for welding together the differently polarized lead terminals of the adjacent electric cells can be inserted from a direction transverse to the direction of the protrusion of the lead terminals, the insertion ports being formed between adjacent ones of the plurality of holder members in a state in which at least some of the plurality of holder members are stacked.

2. The electricity storage module according to claim 1, wherein the lead terminals are each provided with a stress reducing portion for reducing stress applied to the lead terminals during welding.

3. The electricity storage module according to claim 2, wherein the differently polarized lead terminals of the adjacent electricity storage elements are connected by laser welding.

4. The electricity storage module according to claim 2, wherein the stress reducing portions are protrusions of the lead terminals.

5. The electricity storage module according to claim 1, wherein the differently polarized lead terminals of the adjacent electricity storage elements are connected by laser welding.

6. The electricity storage module according to claim 1, wherein the end portions of the lead terminals overlap each other.

7. The electricity storage module according to claim 1, wherein the insertion ports are provided at a front side surface and a rear side surface of each of the plurality of holder members.

* * * * *